United States Patent
Narayanaswamy et al.

(10) Patent No.: US 6,275,931 B1
(45) Date of Patent: *Aug. 14, 2001

(54) METHOD AND APPARATUS FOR UPGRADING FIRMWARE BOOT AND MAIN CODES IN A PROGRAMMABLE MEMORY

(75) Inventors: Shanthala Narayanaswamy, Willoughby Hills; Richard J. Molnar, Mentor, both of OH (US); Michael J. Wozniak, Altamonte Springs, FL (US)

(73) Assignee: Elsag International N.V., Amsterdam (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,183

(22) Filed: Jun. 22, 1998

(51) Int. Cl.⁷ ........................................................ G06F 9/00
(52) U.S. Cl. ....................................................... 713/2; 711/4
(58) Field of Search ................................. 713/2, 1; 711/4, 711/1

(56) References Cited

U.S. PATENT DOCUMENTS

| | | | |
|---|---|---|---|
| 5,063,496 | * | 11/1991 | Dayan et al. . |
| 5,214,695 | * | 5/1993 | Arnold et al. ............................ 380/4 |
| 5,432,927 | | 7/1995 | Grote et al. ........................... 395/575 |
| 5,568,641 | | 10/1996 | Nelson et al. ........................ 395/700 |
| 5,579,522 | * | 11/1996 | Christeson et al. ...................... 713/2 |
| 5,758,174 | * | 5/1998 | Crump et al. ......................... 713/323 |
| 5,778,070 | * | 7/1998 | Mattison ................................ 380/25 |
| 5,805,882 | * | 9/1998 | Cooper et al. ........................... 713/2 |
| 5,812,390 | * | 9/1998 | Merkin ................................ 364/131 |
| 5,987,605 | * | 11/1999 | Hill et al. ................................ 713/2 |

* cited by examiner

Primary Examiner—Robert Beausoleil
Assistant Examiner—Rita A Ziemer
(74) Attorney, Agent, or Firm—Michael M. Rickin

(57) ABSTRACT

A system for loading upgraded, that is, new boot code and/or main firm ware has a programmable memory that has two boot code regions. One of the regions holds the active boot code while the other region holds the inactive boot code. During a boot code upgrade, the boot code in the inactive region, is under control of the boot code in the active region, replaced with the new boot code. Once the replacement process is verified as having been successful and the vector table in the new boot code is copied to the processor vector table in the memory, the processor can be reset so that the new boot code becomes the active boot code and the previously active boot code becomes the inactive boot code.

34 Claims, 4 Drawing Sheets

METHOD AND APPARATUS FOR UPGRADING FIRMWARE BOOT AND MAIN CODES IN A PROGRAMMABLE MEMORY

1. FIELD OF THE INVENTION

This invention relates to the upgrading of either or both of the firmware boot and main codes in a programmable memory.

2. DESCRIPTION OF THE PRIOR ART

Programmable memory and microprocessors are used in many devices. One such device is a remote handheld terminal that is used by technicians in the process industries for process control system configuration, monitoring, tuning and diagnostics. The handheld terminal has firmware therein stored in the programmable memory. The firmware includes the boot code and the main code. The main code is used for the regular operation of the handheld terminal.

Sometimes it is necessary to upgrade the firmware in the remote handheld terminal. A need for upgrading the boot code might arise when the functionality of that code is enhanced. The main firmware will be upgraded whenever the normal functionality of the handheld terminal has to be enhanced or modified. Therefore, the upgrade of firmware in the remote handheld terminal may include an enhancement of the functionality of the terminal. In that instance, the firmware upgrading technique must allow for a flexible size and location remapping of the boot and main firmware codes without any need for hardware changes.

One technique that is now used to upgrade the firmware of a remote handheld terminal is to open the terminal and insert programmable memory with the new firmware therein in place of the programmable memory in the terminal. As can be appreciated, this technique involves both cost and delay in upgrading the terminal to the new firmware as programmable memory must first be programmed with the new firmware and then delivered to the sites where the terminals are used. As can further be appreciated, this technique usually requires an instrument technician or other person with knowledge of electronic circuitry to open and replace the programmable memory, and may result in damage to the handheld terminal during the replacement process.

U.S. Pat. Nos. 5,432,927 and 5,568,641 describe other techniques that may be used to upgrade the boot firmware in a remote handheld terminal. Both of these techniques rely on hardware assisted mapping of the boot code addresses. Therefore, neither of these techniques would allow the size and location of the boot codes in the processor address map of the handheld terminal to be changed without a hardware change. As is described above, such a change is not desirable as it requires that the terminal be opened.

SUMMARY OF THE INVENTION

A system for providing new boot code for a processor.

The system has a writable non-volatile memory. The memory has one region that has active non-write protected boot code therein which has the functionality to allow an instrument containing the memory to communicate with a process control; and another region that has inactive boot non-write protected code therein which is a functional equivalent of the active boot code. The system also has a source of the new boot code; and a processor and associated electronics that is under the control of the active boot code for replacing the inactive boot code with the new boot code from the source.

A system for providing new boot code for a processor. The system has a writable non-volatile memory. The memory has one region that has active non-write protected boot code therein which has the functionality to allow an instrument containing the memory to communicate with a process control; and another region that has inactive non-write protected boot code therein. The system also has a source of the new boot code connected to the processor. The processor operating under control of the active boot code replaces the inactive boot code with the new boot code from the source.

A method of providing new boot code for a processor. The method has a step of providing a writable non-volatile memory having one region having active non-write protected boot code for the processor therein which has the functionality to allow an instrument containing the memory to communicate with a process control and another region having inactive non-write protected boot code for the processor therein which is a functional equivalent of the active boot code. The method also has the steps of connecting a source of new boot code to the processor; transmitting the new boot code from the source to the processor; and writing under control of the active boot code the new boot code to the another region to thereby replace the inactive boot code.

In a device that has a processor a method of providing new boot code for the processor. The method has the step of providing in the device a writable non-volatile memory having one region having active non-write protected boot code for the processor therein which has the functionality to allow an instrument containing the memory to communicate with a process control and another region having inactive non-write protected boot code for the processor therein which is a functional equivalent of the active boot code. The method also has the steps of connecting a source of new boot code to the processor; transmitting the new boot code from the source to the processor; and writing under control of the active boot code the new boot code to the another region to thereby replace the inactive boot code.

A system for providing new boot code for a processor in a device. The system has a writable non-volatile memory in the device. The memory has one region that has active non-write protected boot code therein which has the functionality to allow an instrument containing the memory to communicate with a process control; and another region that has inactive non-write protected boot code therein which is a functional equivalent of the active boot code. The system also has a means for connecting a source of the new boot code to the device; and a means including the processor and under control of the active boot code for replacing the inactive boot code with the new boot code from the source.

A method for upgrading the boot code in an instrument that has a non-volatile memory. The memory has a first boot code block having a vector table and a boot code area and a second boot code block having a vector table and a boot code area. Each of the first and the second boot code areas having boot code in them. The method has the step of determining from a processor vector table stored in the non-volatile memory which of the first and second boot code blocks is then currently active. The method also has the step of writing the upgraded boot code and an associated vector table into the boot code area and vector table area, respectively, of that one of the first and the second boot code blocks which is not then currently active. The method has the further step of determining the successful transfer of the upgraded boot code and the associated vector table to that one of the first and the second boot code blocks which is not then currently active. The method also has the further steps of causing the then currently active boot code to overwrite the processor vector table with the vector table associated with the upgraded boot code; and resetting the instrument upon verification that the overwriting of the processor vector table has occurred so that the upgraded boot code becomes the currently active boot code for the instrument after resetting has occurred.

A method for upgrading the boot code in an instrument having a non-volatile memory. The memory has a first boot code block having a vector table and a boot code area with currently active boot code and a second boot code block having a vector table and a boot code area with currently inactive boot code. The method has the step of writing the upgraded boot code and an associated vector table into the boot code area and vector table area, respectively, of the second boot code block. The method also has the step of determining the successful transfer of the upgraded boot code and the associated vector table to the second boot code block. The method has the further step of causing the then active boot code to overwrite the processor vector table with the associated upgraded vector table. The method also has the further step if resetting the instrument upon verification that the overwriting of the processor vector table has occurred to thereby make the upgraded boot code the active boot code for the instrument after the resetting has occurred.

A method for operating an instrument having a non-volatile memory. The memory has a first boot code block having a vector table and a boot code area with currently active boot code and a second boot code block having a vector table and a boot code area with currently inactive boot code. The method has the step of using the currently active boot code to operate the instrument. The method also has the step of upgrading the currently inactive boot code. The upgrading step has the steps of:

(i) writing the upgraded boot code and an associated vector table into the boot code area and vector table area, respectively, of the second boot code block;

(ii) determining the successful transfer of the upgraded boot code and the associated vector table to the second boot code block;

(iii) causing the active boot code to overwrite the processor vector table with the associated upgraded vector table; and (iv) resetting the instrument upon verification that the overwriting of the processor vector table has occurred to thereby make the upgraded boot code the active boot code for the instrument after the resetting has occurred.

A system for upgrading boot code in a non-volatile memory of an instrument. The system has a processing device having the upgraded boot code. The instrument is connected to the processing device for receiving the upgraded boot code from the processing device. The instrument non-volatile memory has:

(i) a first boot code block having a vector table and a boot code area with currently active boot code therein;

(ii) a second boot code block having a vector table and a boot code area with currently inactive boot code therein; and (iii) a processor vector table stored therein.

The processing device causes the instrument to overwrite the currently inactive boot code with the upgraded boot code and the vector table of the second boot code block with a vector table associated with the upgraded boot code, and the currently active boot code to overwrite the processor vector table with the associated upgraded vector table. The processing device also causes the currently active boot code to reset the instrument when the overwriting of the processor vector table has occurred to thereby make the upgraded boot code the active boot code for the instrument after the resetting has occurred.

A method for upgrading boot code in a non-volatile memory of an instrument. The memory has a first boot code block having a vector table and a boot code area with currently active boot code therein and a second boot code block having a vector table and a boot code area with currently inactive boot code therein. The method has the step of connecting the instrument to a processing device for receiving the upgraded boot code from the processing device. The method also has the step of upgrading the currently inactive boot code. This step has the steps of:

(i) writing the upgraded boot code and an associated vector table into the boot code area and vector table area, respectively, of the second boot code block;

(ii) determining the successful transfer of the upgraded boot code and the associated vector table to the second boot code block;

(iii) causing the active boot code to overwrite a processor vector table stored in the memory with the associated upgraded vector table; and (iv) resetting the instrument upon verification that the overwriting of the processor vector table has occurred to thereby make the upgraded boot code the active boot code for the instrument after the resetting has occurred.

DESCRIPTION OF THE PREFERRED EMBODIMENT(S)

Figure 1:
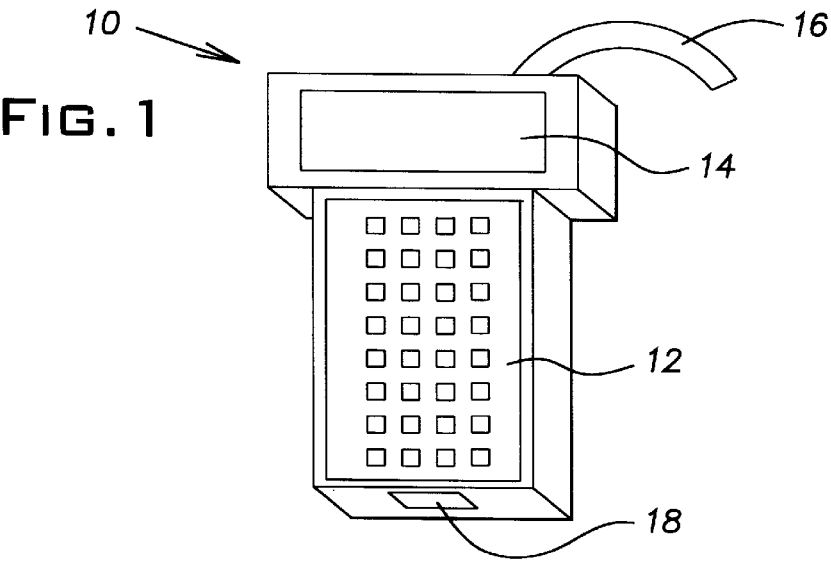
FIG. 1 shows a handheld terminal.

Referring now to FIG. 1, there is shown an example of a remote handheld terminal 10 used in the process control industries. Terminal 10 includes a keypad 12 which includes keys that turn the terminal on and off as well as various keys that allow the technician to configure, monitor and troubleshoot process control field devices. Terminal 10 further includes a display 14 and a cord 16. The cord 16 has clip leads (not shown) which are used to clip onto the signal wires of the field devices.

Handheld terminal 10 further includes an RS232 port 18 which may, be for example, be located in the bottom of terminal 10 as is shown in FIG. 1. Port 18 allows the handheld terminal 10 to be connected by a suitable cable to the serial port of a personal computer (PC) 32 [see FIG. 3] so that in accordance with the present invention the boot and/or main firmware in the terminal can be upgraded.

Figure 2:
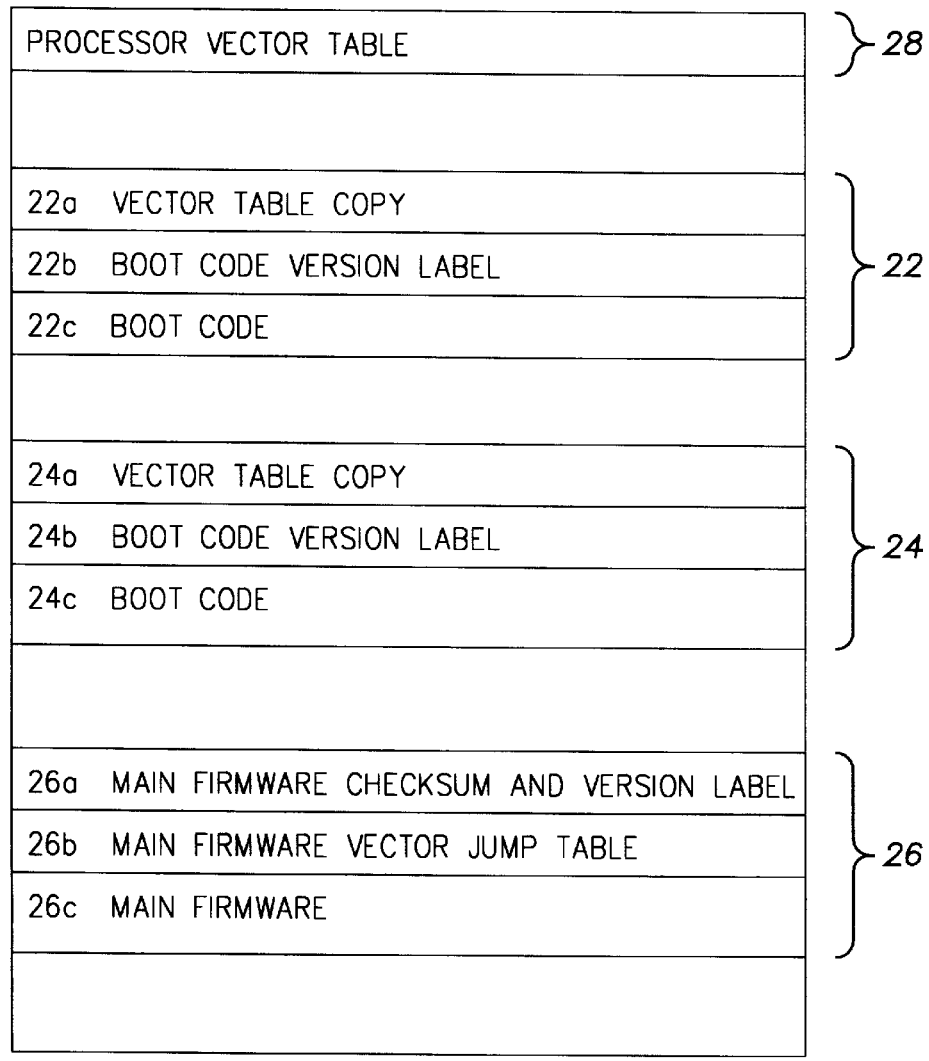
FIG. 2 shows a simplified layout for the programmable memory in the handheld terminal.
Figure 3:
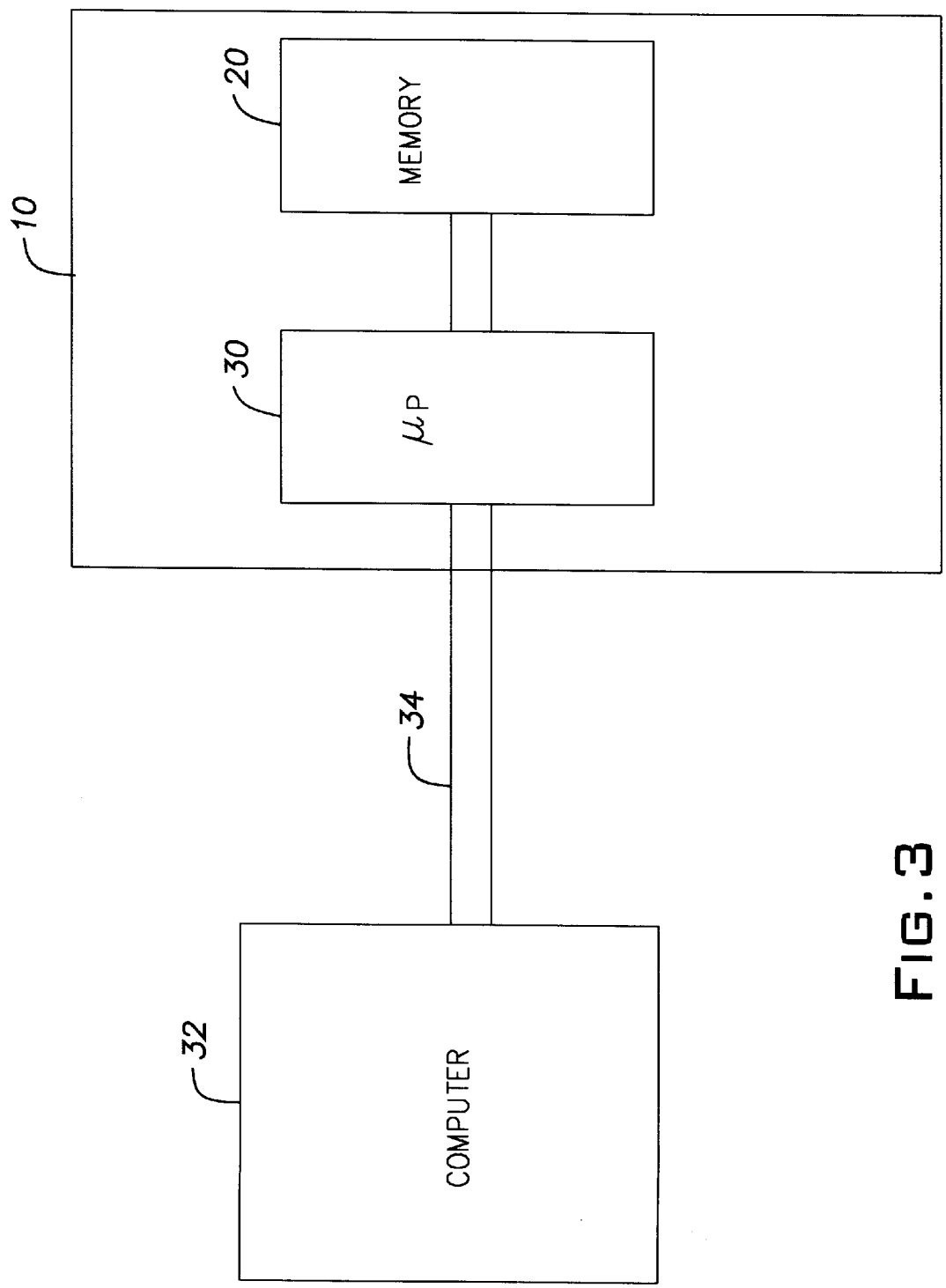
FIG. 3 is a block diagram showing the connection of the handheld terminal to a source of new boot code and/or main firmware.

Internal to the terminal 10 is a programmable memory 20, a simplified layout for which is shown in FIG. 2, and a microprocessor and associated electronics 30 (see FIG. 3). Memory 20 may for example be a Flash electrically erasable programmable read-only memory. As is shown in FIG. 2, the memory 20 is partitioned into functional software units where the boot code and main firmware reside. Specifically, in memory 20 there are first and second boot code units 22, 24, main firmware unit 26, and process vector table 28. As will be described in more detail below, the first boot code and second boot code are not simultaneously active. When the first boot code is active the second boot code is inactive and vice versa.

Each of the boot code units 22, 24 include a copy of the vector table 22a, 24a at the top of each of units 22, 24. Directly below the vector table, each unit includes a version label 22b, 24b and directly below the version label each unit includes the boot code 22c, 24c. The main firmware unit includes at its top a checksum and version label 26a. Directly below the checksum and version label, the main firmware table includes a vector jump table 26b.

The main firmware 26c is directly below the vector jump table.

The upgrading of the boot code will first be described below followed by a description of the upgrading of the main firmware. When the boot code and/or main firmware in terminal 10 is to be upgraded, the RS232 port 18 of terminal 10 is, as is shown in the block diagram of FIG. 3, connected to the serial port 36 of the PC 32 by cable 34. PC 32 includes the application software that communicates with the terminal 10 during the upgrade.

When terminal 10 is operating, either boot code 1 or boot code 2, but not both, is active. The microprocessor 30 operates under control of the then active boot code to perform the upgrade of the boot code and/or main firmware. In the boot code upgrade, the inactive boot code is replaced with upgraded, that is, new boot code from PC 32. When terminal 10 and thus microprocessor 30 is reset, the new boot code becomes the active boot code. In the main firmware upgrade, the main firmware then in terminal 10 is replaced with new main firmware from the PC 32.

In both upgrades the files for the upgraded boot code firmware and the upgraded main firmware are made available to a registered user of the handheld terminal 10 on an Internet web site. The registered user can log on to the web site and download the upgrade file(s) from the web site onto PC 32. The boot code and main firmware addresses are encrypted in the associated upgrade file so that PC 32 can control the addresses in memory 20 into which the upgraded boot code and/or main firmware are written. The files for the upgraded firmware that are posted on the web site may be encrypted for purposes of security and also contain the version number and checksum information.

Boot Code Upgrade

In the procedure for upgrading of the boot code, the new, that is, upgraded, boot code replaces the boot code in the inactive boot code block of terminal 10. For example, if boot code block 22 is active during the boot code upgrade then the new boot code will be written into boot code block 24. Upon the resetting of terminal 10 and thus microprocessor 30, the new boot code will become the active boot code of the handheld terminal 10.

The specific procedure for upgrading the boot code including swapping the upgraded boot code for the non-upgraded boot code is as follows:

1. The PC application software sends a command to the terminal 10 to read the processor vector table 28 to thereby determine which one of the boot code blocks 22, 24 is currently active in the terminal. For purposes of explanation it will be presumed hereinafter that boot code 22c is active in terminal 10.
2. The PC then requests the handheld active boot code 22c to start tracking a checksum on the data, that is the new boot code, being written into the inactive block 24. The new code is then sent to the inactive boot code block 24.

The new boot code can be written to a start address that is different than the start address of the inactive boot code. This flexibility allows boot code block 24 to be moved to accommodate an increase in the size of the new boot code now being written to block 24 or an increase in the size of boot code block 22 that is planned to appear in the next upgrade. It should be appreciated that the new boot code should not overwrite any part of the active boot code. The relocation of block 24 is taken into account when vector table copy 24a is written into the processor vector table 28 at the end of the upgrade procedure.

3. After the PC upgrades the inactive boot code block 24, the PC confirms the checksum of the newly loaded upgraded boot code 24.
4. Upon confirmation of the checksum the PC sends a command to terminal 10 to indicate that the new boot code firmware was successfully transferred to boot code block 24. This command is also a request to the active boot code 22c to turn off all interrupt activity and copy the new vector table copy 24a transmitted from the PC into the processor vector table 28 and reset the handheld terminal 10. The vector table copy 24a of the new boot code 24c has to be transferred to the processor vector table 28 of memory 20 to make the new boot code 24c the active boot code of the terminal 10.
5. In response to the command from the PC to transfer the new vector table copy 24a into the processor vector table 28, the terminal 10 shuts off all of its interrupts in order to make sure that none of the interrupt vectors are used. The terminal then overwrites the processor vector table 28 with the vector table copy 24a of the newly upgraded boot code 24c.
6. Upon verification by the now active boot code 22c that the overwrite of processor vector table 28 has occurred, the boot code 22c resets the terminal 10. Upon terminal 10 reset, the upgraded boot code 24c becomes the active boot code of the terminal.

It should be appreciated that at the end of the successful upgrade of boot code block 24 described above, boot code 24c of block 24, that is the new boot code, is the active boot code for the handheld terminal 10 and boot code 22c of block 22 is inactive as that is the old, that is, not upgraded, boot code. The next time the boot code is to be upgraded, it will be boot code 22c in inactive block 22 that is upgraded. At the successful end of that upgrade, the new boot code of boot code 22c of block 22 will become the active boot code for the terminal 10 and the old boot code of boot code 24c of block 24 will become the inactive boot code. Therefore, each successful upgrade of the boot code causes the previously inactive boot code block to become the active boot code and the previously active boot code block to become the inactive boot code block.

Main Firmware Upgrade

The specific procedure for upgrading the main firmware is as follows:

1. The PC application program sends commands to the terminal 10 to prepare the terminal for the upgrade. These commands request the active boot code to start checking a checksum on the data, for, the new, that is, upgraded main firmware to be written into the memory 20.
2. The PC transmits the new main firmware to terminal 10. The new main firmware can be written to a start address which is different than the start address of the present main firmware. This flexibility allows the main firmware block 26 to be moved to accommodate an increase in size of the main firmware now being written or a planned increase in the size of the next upgrade of the main firmware or the boot code.

3. The PC confirms the checksum check at the end of the transfer to verify that the transfer was successful.

4. Upon verification of a successful transfer, the PC will send a reset command to the terminal 10 so that the terminal can start running the new firmware.

The interrupt vectors in the main firmware are double indexed through a fixed table. The processor vector table 28 will point to a location in the main firmware vector jump table 26b which in turn points to a location in the main firmware 26c. Therefore, even if the main firmware vector jump table 26b is changed by the main firmware upgrade the double indexing avoids the need to upgrade the processor vector table 28 at the end of the main firmware upgrade.

Figure 4A:
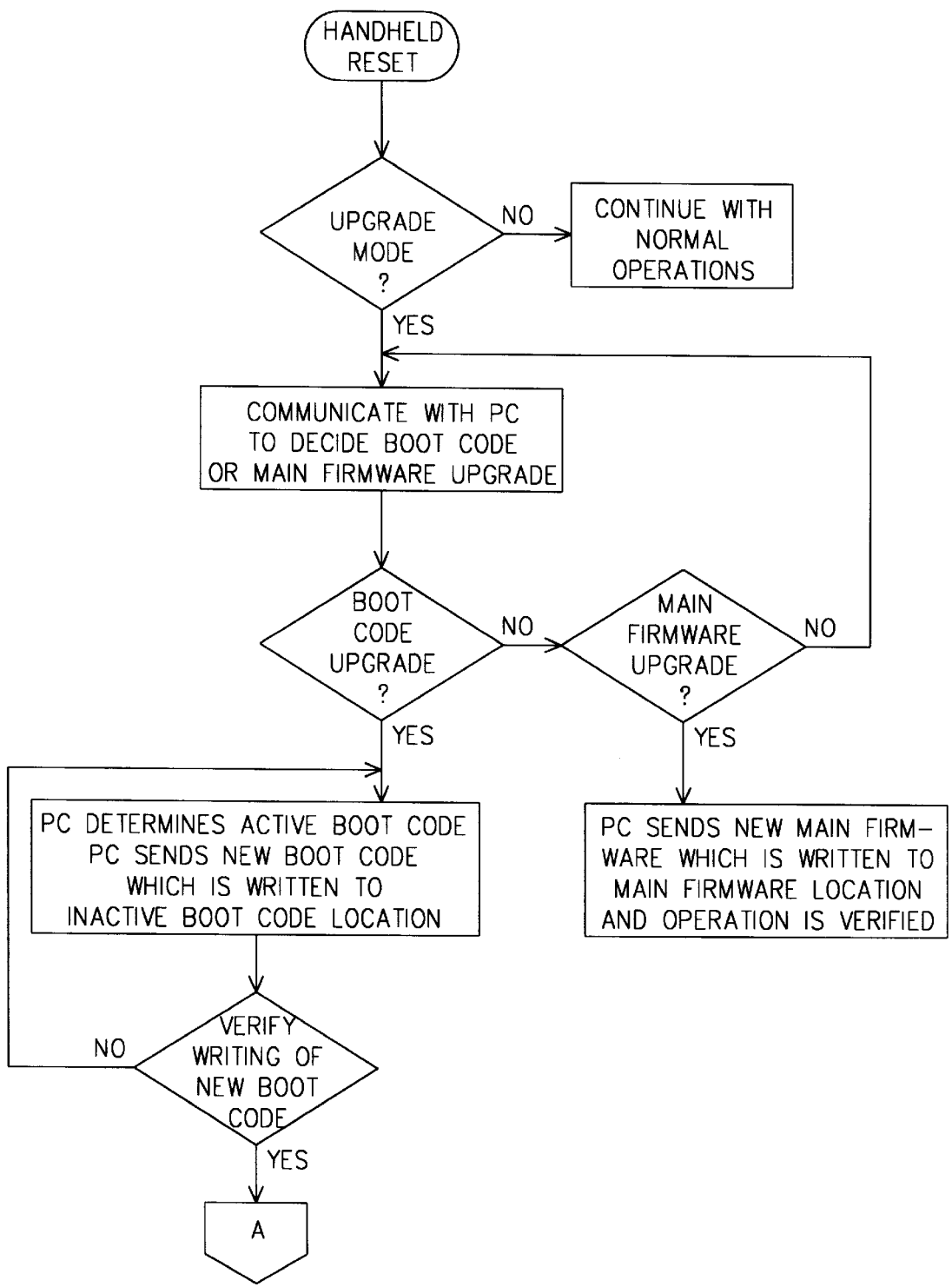
FIGS. 4A and 4B show a flowchart for the boot code and main firmware upgrade procedures.
Figure 4B:
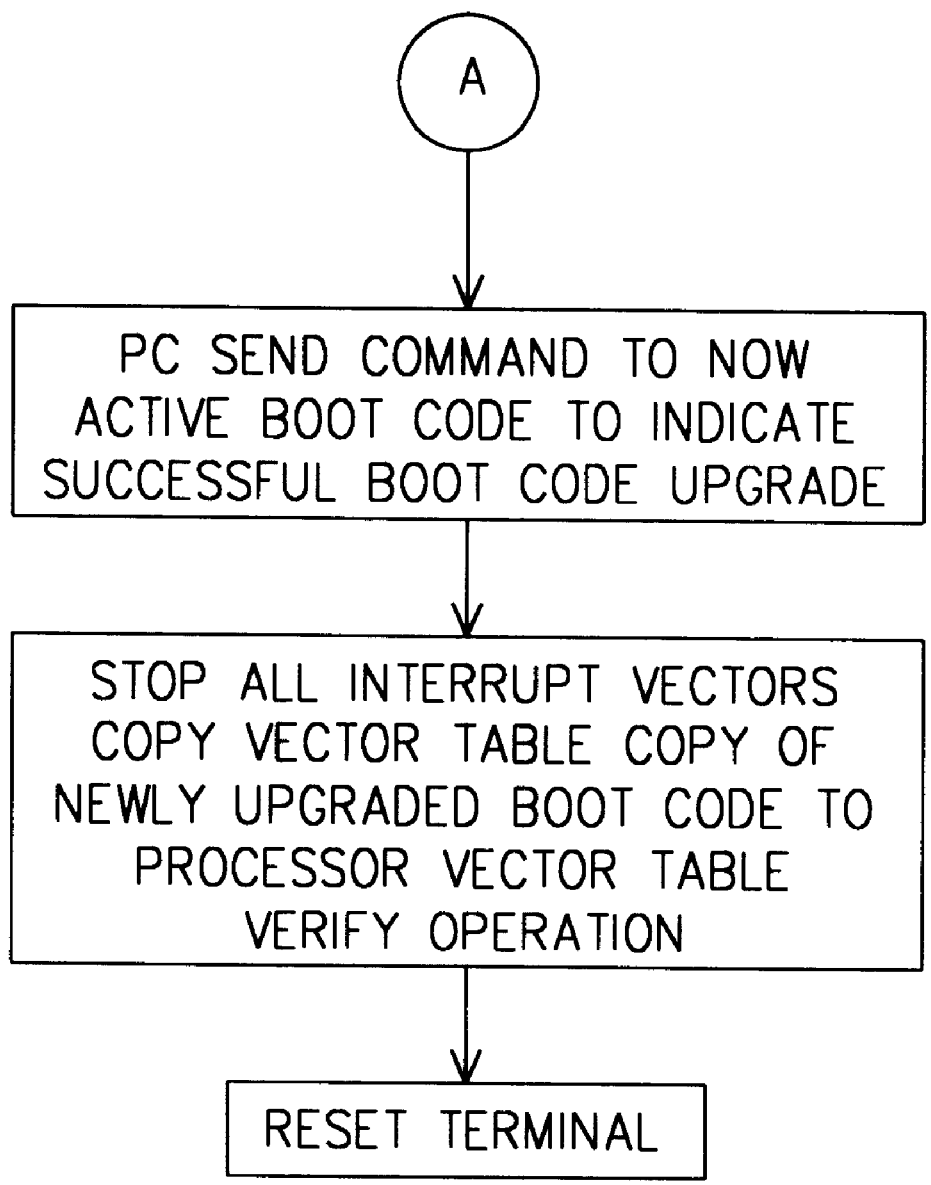

FIGS. 4A and 4B show a flowchart for the boot code and main firmware upgrade procedures described above.

As was described above, the boot code and main firmware addresses are encrypted in the associated upgrade file so that the PC can control the addresses in memory 20 into which the upgraded boot code and/or main firmware are written. Therefore, the size and starting address of the boot code blocks 22, 24 and the main firmware block 26 in memory 20 are not fixed and can be changed through the upgrade procedure. The only limitations on increasing the size of blocks 22, 24 and 26 are the size of memory 20 and the size of an adjacent block during the upgrade of blocks 22, 24 and 26. For example, an increase in the size of main firmware block 26 through the upgrade procedure described above is limited by adjacent block 24. It should be appreciated that a series of upgrades can result in the increase of the size of block 26 by moving and/or shrinking blocks 22 and 24.

A boot code or main firmware upgrade procedure may fail prior to completion for any one of a number of reasons including a power failure or a break in the cable 34 connecting port 18 to the PC. Even if the procedure were to fail prior to completion, the terminal 10 is still operable. If the main firmware upgrade fails prior to completion the operator can start terminal 10 again using the boot code firmware contained in memory 20 and reinitiate the main firmware upgrade. During a boot code firmware upgrade the boot code being upgraded is in the inactive boot code block. Therefore a failure in the upgrade prior to completion is not a problem as the terminal can still operate using the active boot code.

The flexibility described above in writing new boot code or main firmware is also applicable where the new code is the same size as or less even than the code it is replacing.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for providing new boot code for a processor comprising:
   a. a writable non-volatile memory comprising:
      i. one region having active non-write protected boot code therein, said boot code having the functionality to allow an instrument containing said memory to communicate with a process control system; and
      ii. another region having therein an inactive non-write protected boot code which is a functional equivalent of said active boot code;
   b. a source of said new boot code; and
   c. means including said processor and under control of said active boot code for replacing said inactive boot code with said new boot code from said source.

2. The system of claim 1 wherein said memory further comprises a processor vector table and said new boot code includes a vector table, said replacing means causing after said new boot code has replaced said inactive boot code said new boot code vector table to be copied to said memory processor vector table so that said new boot code can become said active boot code upon resetting of said processor.

3. A system for providing new boot code for a processor comprising:
   a. a writable non-volatile memory comprising:
      i. one region having non-write protected active boot code therein, said boot code having the functionality to allow an instrument containing said memory to communicate with a process control system; and
      ii. another region having therein an inactive non-write protected boot code which is a functional equivalent of said active boot code; and
   b. a source of said new boot code connected to said processor;
   said processor operating under control of said active boot code for replacing said inactive boot code with said new boot code from said source.

4. The system of claim 3 wherein said memory further comprises a processor vector table and said new boot code includes a vector table, said processor causing after said new boot code has replaced said inactive boot code said new boot code vector table to be copied to said memory processor vector table so that said new boot code can become said active boot code upon resetting of said processor.

5. A method of providing new boot code for a processor, comprising the steps of:
   a. providing a writable non-volatile memory having one region having active non-write protected boot code for said processor therein, said boot code having the functionality to allow an instrument containing said memory to communicate with a process control system and another region having therein an inactive non-write protected boot code which is a functional equivalent of said active boot code;
   b. connecting a source of new boot code to said processor;
   c. transmitting said new boot code from said source to said processor; and
   d. writing under control of said active boot code said new boot code to said another region to thereby replace said inactive boot code.

6. The method of claim 5 further including after said writing step the step of verifying that said new boot code is written to said another region.

7. The method of claim 6 wherein said memory also has a processor vector table and said new boot code includes a vector table and said method further includes after said verifying step the step of copying said new boot code vector table to said memory processor vector table.

8. The method of claim 7 further including after said copying step the step of resetting said processor so that said new boot code becomes said active boot code.

9. In a device having a processor a method of providing new boot code for said processor, comprising the steps of:
   a. providing in said device a writable non-volatile memory having one region having active non-write protected boot code for said processor therein, said boot code having the functionality to allow an instrument containing said memory to communicate with a process control system and another region having therein an inactive non-write protected boot code which is a functional equivalent of said active boot code;

b. connecting a source of new boot code to said processor;
c. transmitting said new boot code from said source to said processor; and
d. writing under control of said active boot code said new boot code to said another region to thereby replace said inactive boot code.

10. The method of claim 9 wherein said new boot code source is external to said device.

11. The method of claim 9 further including after said writing step the step of verifying that said new boot code is written to said another region.

12. The method of claim 11 wherein said memory also has a processor vector table and said new boot code includes a vector table and said method further includes after said verifying step the step of copying said new boot code vector table to said memory processor vector table.

13. The method of claim 12 further including after said copying step the step of resetting said processor so that said new boot code becomes said active boot code.

14. A system for providing new boot code for a processor in a device, comprising:
   a. a writable non-volatile memory in said device, said memory comprising:
      i. one region having active non-write protected boot code therein, said boot code having the functionality to allow an instrument containing said memory to communicate with a process control system; and
      ii. another region having therein an inactive non-write protected boot code which is a functional equivalent of said active boot code;
   b. means for connecting a source of said new boot code to said device; and
   c. means including said processor and under control of said active boot code for replacing said inactive boot code with said new boot code from said source.

15. The system of claim 14 wherein said device has a housing and said processor, said replacing means, and said memory are inside said housing.

16. The system of claim 15 wherein said new boot code source is outside of said housing.

17. The system of claim 15 wherein said source includes a connector and said means for connecting said source to said device comprises a connector on said housing and a cable compatible with said source connector and said housing connector.

18. A method for upgrading the boot code in an instrument having a non-volatile memory having a first boot code block having a vector table and a boot code area therein, and a second boot code block having a vector table and a boot code area therein, each of said first and said second boot code areas having non-write protected boot code therein, said method comprising the steps of:
   (a) determining from a processor vector table stored in said non-volatile memory which of said first and said second boot code blocks is then currently active, said boot code in said first boot code area having the functionality to allow said instrument to communicate with a process control system;
   (b) writing said upgraded boot code and an associated vector table into said boot code area and vector table area, respectively, of that one of said first and said second boot code blocks which is not then currently active;
   (c) determining the successful transfer of said upgraded boot code and said associated vector table to that one of said first and said second boot code blocks which is not then currently active;
   (d) causing said then currently active boot code to overwrite said processor vector table with said vector table associated with said upgraded boot code; and
   (e) resetting said instrument upon verification that said overwriting of said processor vector table has occurred so that said upgraded boot code becomes the currently active boot code for said instrument after resetting has occurred.

19. The method of claim 18 wherein in said writing step said upgraded boot code is written to a start address in said boot code area of that one of said first and said second boot code blocks which is not then currently active which is different than the start address of the boot code in said boot code area of that one of said first and said second boot code blocks which is then currently active.

20. The method of claim 18 wherein said boot code in said first boot code block boot code area and said boot code in said second boot code block second area are functional equivalents of each other.

21. The method of claim 18 wherein said step of determining which of said first and said second boot code blocks is then currently active is preceded by the step of connecting said instrument to a processing device, said processing device obtaining said upgraded boot code from a remote source.

22. A method for upgrading the boot code in an instrument having a non-volatile memory having a first boot code block having a vector table and a boot code area with currently active non-write protected boot code therein, and a second boot code block having a vector table and a boot code area with currently inactive non-write protected boot code therein, said currently active boot code having the functionality to allow said instrument to communicate with a process control system, said method comprising the steps of:
   (a) writing said upgraded boot code and an associated vector table into said boot code area and vector table area, respectively, of said second boot code block;
   (b) determining the successful transfer of said upgraded boot code and said associated vector table to said second boot code block;
   (c) causing said then active boot code to overwrite a processor vector table stored in said memory with said associated upgraded vector table; and
   (d) resetting said instrument upon verification that said overwriting of said processor vector table has occurred to thereby make the upgraded boot code said active boot code for said instrument after said resetting has occurred.

23. The method of claim 22 wherein in said writing step said upgraded boot code is written to a start address in said boot code area of said second boot code block which is different than the start address of said currently active boot code in said boot code area of said first block.

24. The method of claim 22 wherein said currently active boot code and said currently inactive boot code are functional equivalents of each other.

25. The method of claim 22 wherein said writing step is preceded by the step of connecting said instrument to a processing device, said processing device obtaining said upgraded boot code from a remote source.

26. A method for operating an instrument having a non-volatile memory, said memory having a first boot code block having a vector table and a boot code area with currently active non-write protected boot code therein, and a second boot code block having a vector table and a boot code area with currently inactive non-write protected boot code therein, said method comprising the steps of:

(a) using said currently active boot code to operate said instrument, said currently active boot code having the functionality to allow said instrument to communicate with a process control system; and (b) upgrading said currently inactive boot code comprising the steps of:
  (i) writing said upgraded boot code and an associated vector table into said boot code area and vector table area, respectively, of said second boot code block;
  (ii) determining the successful transfer of said upgraded boot code and said associated vector table to said second boot code block;
  (iii) causing said active boot code to overwrite a processor vector table stored in said memory with said associated upgraded vector table; and
  (iv) resetting said instrument upon verification that said overwriting of said processor vector table has occurred to thereby make said upgraded boot code the active boot code for said instrument after said resetting has occurred.

27. The method of claim 26 wherein in said writing step said upgraded boot code is written to a start address in said boot code area of said second boot code block which is different than the start address of said currently active boot code in said boot code area of said first block.

28. The method of claim 26 wherein said currently active boot code and said currently inactive boot code are functional equivalents of each other.

29. The method of claim 26 wherein said writing step is preceded by the step of connecting said instrument to a processing device, said processing device obtaining said upgrade boot code from a remote source.

30. The method of claim 26 wherein said step of upgrading said inactive boot code terminates prior to the completion of said writing step and said instrument continues to operate using only said currently active boot code.

31. A system for upgrading boot code in a nonvolatile memory of an instrument comprising:

(a) a processing device having said upgraded boot code, said instrument connected to said processing device for receiving said upgraded boot code from said processing device;
  said instrument non-volatile memory comprising:
  (i) a first boot code block having a vector table and a boot code area with currently active non-write protected boot code therein, said currently active boot code having the functionality to allow said instrument to communicate with a process control system;
  (ii) a second boot code block having a vector table and a boot code area with currently inactive non-write protected boot code therein; and
  (iii) a processor vector table stored therein;

said processing device causing said instrument to overwrite said currently inactive boot code with said upgraded boot code and said vector table of said second boot code block with a vector table associated with said upgraded boot code, and said currently active boot code to overwrite said processor vector table with said associated upgraded vector table;

said currently active boot code resetting said instrument when said overwriting of said processor vector table has occurred to thereby make said upgraded boot code the active boot code for said instrument after said resetting has occurred.

32. The system of claim 31 wherein said processing device receives said upgraded boot code from a remote source.

33. A method for upgrading boot code in a nonvolatile memory of an instrument, said memory having a first boot code block having a vector table and a boot code area with currently active non-write protected boot code therein, said currently active boot code having the functionality to allow said instrument to communicate with a process control system and a second boot code block having a vector table and a boot code area with currently inactive non-write protected boot code therein, said method comprising the steps of:

(a) connecting said instrument to a processing device for receiving said upgraded boot code from said processing device;

(b) upgrading said currently inactive boot code, said currently inactive boot code a functional equivalent of said currently active boot code, said upgrading comprising the steps of:
  (i) writing said upgraded boot code and an associated vector table into said boot code area and vector table area, respectively, of said second boot code block;
  (ii) determining the successful transfer of said upgraded boot code and said associated vector table to said second boot code block;
  (iii) causing said active boot code to overwrite a processor vector table stored in said memory with said associated upgraded vector table; and
  (iv) resetting said instrument upon verification that said overwriting of said processor vector table has occurred to thereby make said upgraded boot code the active boot code for said instrument after said resetting has occurred.

34. The method of claim 33 further comprising before said step of connecting said instrument to said processing device the step of connecting said processing device to a remote source for receiving said upgraded boot code from said remote source.

* * * * *